(12) United States Patent
Chang et al.

(10) Patent No.: US 10,708,891 B2
(45) Date of Patent: Jul. 7, 2020

(54) METHOD FOR ESTABLISHING EVOLVED PACKET SYSTEM BEARER AND BASE STATION

(71) Applicant: Huawei Technologies Co., Ltd., Shenzhen, Guangdong (CN)

(72) Inventors: Junren Chang, Beijing (CN); Yajuan Li, Shenzhen (CN); Yongping Zhang, Beijing (CN); Liangliang Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/208,402

(22) Filed: Dec. 3, 2018

(65) Prior Publication Data
US 2019/0104511 A1 Apr. 4, 2019

Related U.S. Application Data

(63) Continuation of application No. 15/466,518, filed on Mar. 22, 2017, now abandoned, which is a
(Continued)

(51) Int. Cl.
*H04W 72/04* (2009.01)
*H04W 16/32* (2009.01)
(Continued)

(52) U.S. Cl.
CPC ......... *H04W 72/0406* (2013.01); *H04L 5/001* (2013.01); *H04W 16/32* (2013.01);
(Continued)

(58) Field of Classification Search
None
See application file for complete search history.

(56) References Cited

U.S. PATENT DOCUMENTS 8,442,007 B2 * 5/2013 Liu ............... H04W 36/0033
370/331
8,989,105 B2 * 3/2015 Wu .................. H04W 36/08
370/329
(Continued)

FOREIGN PATENT DOCUMENTS

CN 101594683 A 12/2009
CN 101772179 A 7/2010
(Continued)

OTHER PUBLICATIONS

Bonneville, Herve et al., "Definitions and Architecture Requirements for Supporting Advanced Relay Concepts", ARTIST4G Project, 2010, 54 pages.
(Continued)

*Primary Examiner* — Hong S Cho
(74) *Attorney, Agent, or Firm* — Conley Rose, P.C.

(57) ABSTRACT

A method and a device for establishing an evolved packet system EPS bearer are disclosed. The method includes establishing, by a first base station to which UE belongs, a first EPS bearer based on a first CC for the UE, wherein the first EPS bearer is an EPS bearer between the first base station and the UE; and instructing, by the first base station, a second base station to establish a second EPS bearer based on a second CC for the UE, wherein the second EPS bearer is an EPS bearer between the second base station and the UE. The present invention enables the UE to aggregate carriers of different frequency ranges from the first base station to which the UE belongs and the second base station to which the UE belongs to transmit data, thus improving the throughput of the data transmitted by the UE.

20 Claims, 4 Drawing Sheets

Related U.S. Application Data continuation of application No. 14/491,584, filed on Sep. 19, 2014, now Pat. No. 9,629,124, which is a continuation of application No. PCT/CN2012/072695, filed on Mar. 21, 2012.

(51) Int. Cl.

| | | |
|---|---|---|
| *H04W 76/15* | (2018.01) | |
| *H04L 5/00* | (2006.01) | |
| *H04W 84/04* | (2009.01) | |
| *H04W 88/08* | (2009.01) | |
| *H04W 88/16* | (2009.01) | |

(52) U.S. Cl.
CPC .......... *H04W 76/15* (2018.02); *H04W 84/047* (2013.01); *H04W 88/08* (2013.01); *H04W 88/16* (2013.01)

(56) References Cited

U.S. PATENT DOCUMENTS

| | | | | |
|---|---|---|---|---|
| 9,167,506 | B2* | 10/2015 | Faccin | H04W 48/08 |
| 9,271,316 | B2* | 2/2016 | Bakker | H04W 76/11 |
| 2009/0225719 | A1* | 9/2009 | Zhi | H04W 72/12 |
| | | | | 370/329 |
| 2010/0080116 | A1* | 4/2010 | Agashe | H04W 36/08 |
| | | | | 370/216 |
| 2010/0260143 | A1* | 10/2010 | Tanabe | H04W 36/0022 |
| | | | | 370/331 |
| 2011/0151882 | A1 | 6/2011 | Hwang et al. | |
| 2011/0312348 | A1* | 12/2011 | Kulakov | H04W 28/06 |
| | | | | 455/458 |
| 2012/0014257 | A1* | 1/2012 | Ahluwalia | H04W 48/12 |
| | | | | 370/241 |
| 2012/0182929 | A1 | 7/2012 | Chen et al. | |
| 2012/0289220 | A1 | 11/2012 | Yang et al. | |
| 2013/0210384 | A1* | 8/2013 | Zhang | H04W 76/12 |
| | | | | 455/410 |
| 2013/0294403 | A1* | 11/2013 | Srinivasan | H04W 36/165 |
| | | | | 370/331 |
| 2018/0146504 | A1* | 5/2018 | Xiao | H04W 76/10 |

FOREIGN PATENT DOCUMENTS

| | | |
|---|---|---|
| CN | 102036256 A | 4/2011 |
| CN | 102098676 A | 6/2011 |
| CN | 102244937 A | 11/2011 |
| CN | 102647265 A | 8/2012 |
| EP | 2230872 A1 | 9/2010 |
| EP | 2675228 A1 | 12/2013 |

OTHER PUBLICATIONS

3GPP TS 36.331 V10.5.0, 3rd Generation Partnership Project; Technical Specification Group Radio Access Network; Evolved Universal Terrestrial Radio Access (E-UTRA); Radio Resource Control (RRC); Protocol specification (Release 10), Mar. 2012, 302 pages.

3GPP TS 36.423 V11.0.0, 3rd Generation Partnership Project; Technical Specification Group Radio Access Network; Evolved Universal Terrestrial Radio Access Network (E-UTRAN); X2 application protocol (X2AP)(Release 11), Mar. 2012, 134 pages.

Bonneville, H., et al., "Definitions and Architecture Requirements for Supporting Advanced Relay Concepts," ARTIST4G Project, 2010, 54 pages.

3GPP TS 36.300 V11.1.0, "3rd Generation Partnership Project; Technical Specification Group Radio Access Network; Evolved Universal Terrestrial Radio Access (E-UTRA) and Evolved Universal Terrestrial Radio Access Network (E- UTRAN); Overall description; Stage 2 (Release 11)," Mar. 2012, 194 pages.

3GPP TS 36.331 "3rd Generation Partnership Project; Technical Specification Group Radio Access Network; Evolved Universal Terrestrial Radio Access (E-UTRA); Radio Resource Control (RRC); Protocol specification (Release 10)," Mar. 2012, 302 pages.

3GPP TS 36.423 V11.0.0, "3rd Generation Partnership Project; Technical Specification Group Radio Access Network; Evolved Universal Terrestrial Radio Access (E-UTRA); X2 application protocol (X2AP)(Release 11)," Mar. 2012, 134 pages.

\* cited by examiner

| Carrier 1 | Carrier 2 | Carrier 3 | Carrier 4 | Carrier 5 |
Fig.1
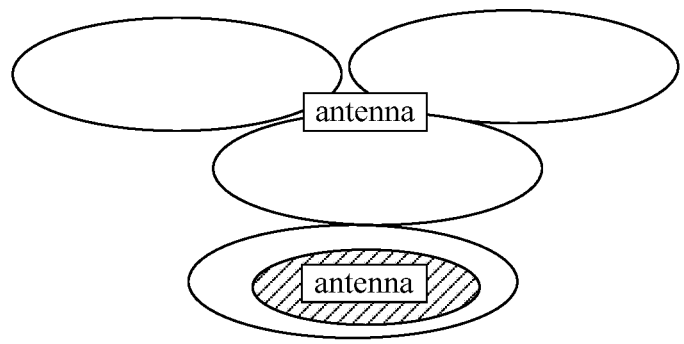
Fig.2
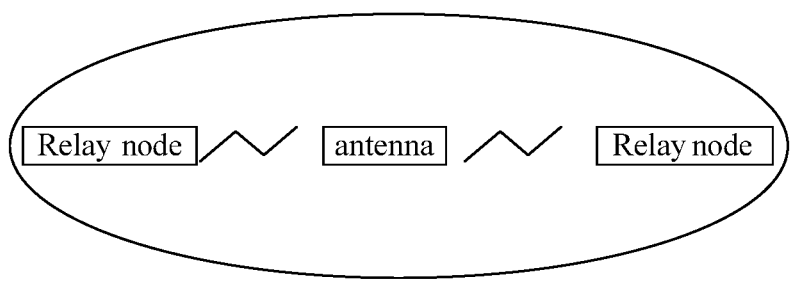
Fig.3

METHOD FOR ESTABLISHING EVOLVED PACKET SYSTEM BEARER AND BASE STATION

CROSS-REFERENCE TO RELATED APPLICATIONS

This application is a continuation of U.S. patent application Ser. No. 15/466,518 filed on Mar. 22, 2017, which is a continuation of U.S. patent application Ser. No. 14/491,584 filed on Sep. 19, 2014, now U.S. Pat. No. 9,629,124, which is a continuation of International Application No. PCT/CN2012/072695 filed on Mar. 21, 2012. All of the aforementioned patent applications are hereby incorporated by reference in their entireties.

TECHNICAL FIELD

The present invention relates to the technical field of communications, and particularly, relates to a method for establishing evolved packet system (EPS) bearer and a base station.

BACKGROUND

To support transmission of a peak data rate up to 1 Gbits/s in a communication system, a carrier aggregation (CA) technology has been adopted as a method for expanding EPS bandwidth in a long term evolution (LTE) system at present. The main idea of the CA technology is to aggregate multiple component carriers (CC) into a carrier with a relatively larger bandwidth to support high-rate data transmission. FIG. 1 is a schematic diagram of a bandwidth structure adopted for transmitting data by adopting the CA technology in the related art. As shown in the figure, the downlink channel bandwidth for transmitting data is formed by aggregating five carriers of 20 MHz, including carrier 1, carrier 2, carrier 3, carrier 4 and carrier 5, and it could be understood that the aggregated carriers may be continuous or discontinuous on a frequency domain.

CA may be divided into two types, one of which is intra-band CA, and the other one of which is inter-band CA. For the intra-band CA, because multiple aggregated carriers are on the same frequency band, the coverage of data transmission of the carriers is consistent. For the inter-band CA, because the multiple aggregated carriers are on different frequency bands, when frequency ranges occupied by the frequency bands are relatively further, the coverage difference of data transmission of the carriers is relatively larger. Generally, the carrier coverage of low frequency ranges is large, and the carrier coverage of high frequency ranges is relatively small. As shown in FIG. 2 which is a schematic diagram of different carrier coverage under the inter-band CA in the related art, the blank area is a range covered by 800 Mhz carrier, the filled area is a range covered by 3 Ghz carrier, and it could be seen that the range covered by the 3 Ghz carrier is smaller than that covered by the 800 Mhz carrier.

It could be seen from FIG. 2 that, if a user equipment (UE) is in the center of a cell, the UE may simultaneously use a high-frequency carrier and a low-frequency carrier in the inter-band CA to transmit data, whereas if the UE moves to the margin of the cell, the UE cannot use the high-frequency carrier to transmit data, and the throughput of the data transmitted by the UE at the margin of the cell declines much compared with that by the UE in the center of the cell.

Accordingly, to improve the throughput of the data transmitted by the UE at the margin of the cell and enlarge the coverage of the high-frequency carriers, a relay node (RN) may be adopted at a network side of a cell to enlarge the coverage of the high-frequency carrier. FIG. 3 shows a schematic diagram of a network structure for enlarging the coverage of high-frequency carriers in the related art, wherein two RNs are added to continuously adopt the high-frequency carrier to transmit data, thus enlarging the coverage of the high-frequency carrier. However, even if the coverage of the high-frequency carrier is enlarged by adopting the RN, if the UE at the margin of the cell wants to simultaneously use the component carriers of high frequency range and low frequency range, the UE still needs to aggregate carriers from two different sites, namely the carrier of the low frequency range comes from a macro base station (DeNB, Donor eNodeB), and the carrier of the high frequency range comes from an RN. This herein is called as inter-site CA.

Therefore, it is a problem to be solved how the UE aggregates different carriers from the DeNB and the RN to transmit the data so as to improve the throughput of the data transmitted by the UE and enhance the experience of the UE.

SUMMARY

Embodiments of the present invention provide a method for establishing an EPS bearer and a base station, so that UE can realize inter-site carrier aggregation.

The technical solutions are realized as follows.

A method for establishing an evolved packet system EPS bearer includes:
determining, by a first base station to which a user equipment UE owning a first EPS bearer based on a first component carrier CC belongs, to establish a second EPS bearer based on a second CC for the UE; and
initiating, by the first base station, a process of establishing the second EPS bearer for the UE.

A method for establishing an evolved packet system EPS bearer includes:
establishing, by a first base station to which a user equipment UE belongs, a first EPS bearer based on a first component carrier CC for the UE, the first EPS bearer being an EPS bearer between the first base station and the UE; and
instructing, by the first base station, a second base station to establish a second EPS bearer based on a second CC for the UE, the second EPS bearer being an EPS bearer between the second base station and the UE.

A base station includes:
a determining unit, configured to determine to establish a second evolved packet system EPS bearer based on a second component carrier CC for a user equipment UE owning a first EPS bearer based on a first CC and trigger an initiating unit; and
the initiating unit, configured to initiate a process of establishing the second EPS bearer for the UE.

A base station includes:
an establishing unit, configured to establish a first evolved packet system EPS bearer based on a first component carrier CC for a user equipment UE, the first EPS bearer being an EPS bearer between the first base station to which the UE belongs and the UE; and
an instructing unit, configured to instruct a second base station to which the UE belongs to establish a second EPS bearer based on a second CC for the UE, the second EPS bearer being an EPS bearer between the second base station to which the UE belongs and the UE.

According to the method and the base station provided in the embodiments of the present invention, a first base station to which a UE belongs establishes a first EPS bearer based on a first CC for the UE and instructs to establish a second EPS bearer based on a second CC, wherein the first EPS bearer is an EPS bearer between the first base station to which the UE belongs and the UE, and the second EPS bearer is an EPS bearer between the second base station to which the UE belongs and the UE. Or, after a first base station to which a UE owning a first EPS bearer based on a first CC belongs determines to establish a second EPS bearer based on a second CC for the UE, the process of establishing the second EPS bearer for the UE is initiated. In this way, the UE can transmit data with the first base station and the second base station to which the UE belongs through two EPS bearers respectively, so that the UE aggregates different carriers from the first base station to which the UE belongs and the second base station to which the UE belongs to transmit the data, thus realizing inter-site carrier aggregation and improving the throughput of the data transmitted by the UE.

BRIEF DESCRIPTION OF THE DRAWINGS

FIG. 1 is a schematic diagram of a bandwidth structure adopted for transmitting data by adopting a CA technology in the related art;

FIG. 2 is a schematic diagram of different carrier coverage under inter-band CA in the related art;

FIG. 3 is a schematic diagram of a network structure for enlarging the coverage of high-frequency carriers in the related art;

DETAILED DESCRIPTION

Figure 4:
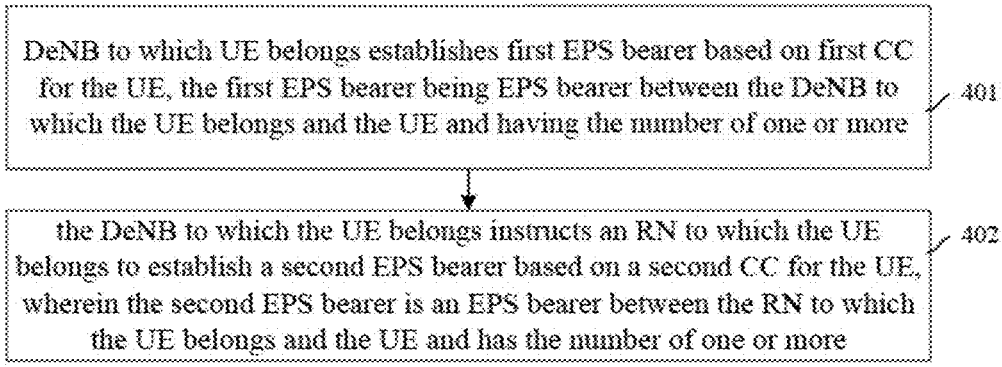
FIG. 4 is a flow diagram of a method for establishing an EPS bearer provided in an embodiment of the present invention.

To make the objectives, technical solutions and advantages of the present invention clearer, the present invention is further illustrated in detail below with reference to the accompanying drawings and embodiments.

In the embodiments of the present invention, to improve the throughput of data transmitted by UE, the UE needs to aggregate different carriers from a DeNB and an RN respectively to transceive data, namely to aggregate carriers from different sites, wherein the sites are the DeNB or the RN. Accordingly, in an embodiment of the present invention, a first base station to which the UE belongs establishes a first EPS bearer based on a first CC for the UE and instructs to establish a second EPS bearer based on a second CC, wherein the first EPS bearer is an EPS bearer between the first base station to which the UE belongs and the UE, and the second EPS bearer is an EPS bearer between the second base station to which the UE belongs and the UE. Or, after a first base station to which a UE owning a first EPS bearer based on a first CC belongs determines to establish a second EPS bearer based on a second CC for the UE, a process of establishing the second EPS bearer for the UE is initiated. In this way, the UE can transmit data with the first base station and the second base station to which the UE belongs through two EPS bearers respectively, and the UE aggregates different carriers from the first base station to which the UE belongs and the second base station to which the UE belongs to transmit the data, thus realizing inter-site carrier aggregation and improving the throughput of the data transmitted by the UE. It should be noted that the site in the embodiments is a serving node of a UE in a broad sense, and may be collectively called as base station, including eNB in a narrow sense and or including a node capable of serving the UE such as a relay node RN, a micro base station and the like. The DeNB to which the UE belongs in the embodiment of the present invention is the one synchronizing with the UE currently.

In an embodiment of the present invention, the first base station to which the UE belongs may be a DeNB to which the UE belongs, and the second base station to which the UE belongs may be an RN to which the UE belongs. Further, in a heterogeneous network, besides the DeNB and the RN, various micro base stations such as Pico eNB, Home eNB and the like may also exist. Accordingly, by substituting a Pico eNB or a Home eNB for the RN in the embodiment of the present invention, under the condition that the UE accesses to two different base stations, current multiple EPS bearers of the UE may also be established on the DeNB and the Pico eNB respectively to transmit different data for the UE. The above-mentioned RN, Pico eNB and Home eNB may be collectively called as micro base station. Certainly, the embodiments are not limited to the scenario of the heterogeneous network, and the first base station and the second base station may be two independent base stations without an attachment relationship with each other.

In the following embodiments, the DeNB to which the UE belongs and the RN to which the UE belongs are taken as an example for illustration.

In the embodiments of the present invention, two solutions are adopted:

The first solution is an active initiating solution. An access network entity such as UE, an RN to which the UE belongs or a DeNB to which the UE belongs initiates an EPS bearer establishment request to a core network entity such as a public data network gateway (PDN-GW), a mobility management entity (MIME) or a serving gateway (S-GW), and the core network entity receives the request and then instructs the DeNB to which the UE belongs to establish a first EPS bearer based on a first CC and a second EPS bearer based on a second CC for the UE, wherein the first EPS bearer is an EPS bearer between the DeNB to which the UE belongs and the UE and has the number of one or more, and the second EPS bearer is an EPS bearer between the RN to which the UE belongs and the UE and has the number of one or more. Or, after the core network receives the request and then instructs that the first base station to which the UE owning the first EPS bearer of the first CC belongs determines to establish the second EPS bearer based on the second CC for the UE, and then initiates a process of establishing the second EPS bearer for the UE. In this way, the UE may transmit data with the DeNB and the RN through the two EPS bearers respectively.

The second solution is an active establishing solution. A DeNB to which UE belongs determines to establish a first EPS bearer and a second EPS bearer for the UE, and the DeNB to which the UE belongs establishes the first EPS bearer based on CC and the second EPS bearer based on CC for the UE, wherein the first EPS bearer is an EPS bearer between the DeNB to which the UE belongs and the UE and has the number of one or more, and the second EPS bearer is an EPS bearer between an RN to which the UE belongs and the UE and has the number of one or more. Or, after a first base station to which the UE owning the first EPS bearer of the first CC belongs independently determines to establish the second EPS bearer based on the second CC for the UE, and initiates a process of establishing the second EPS bearer for the UE. In this way, the UE may transmit data with the DeNB and the RN through the two EPS bearers respectively.

Specifically, the DeNB may establish a data radio bearer (DRB) for the UE with respect to the first EPS bearer to be established and assign a corresponding data radio bearer identifier (DRB ID). In a specific implementation, the DeNB establishes one corresponding DRB for the UE with respect to each EPS bearer to be established, and assigns one corresponding DRB ID. That is to say, one bearer of the UE is called as an EPS bearer between the UE and a core network and correspondingly called as a DRB between the UE and the DeNB. In the embodiments of the present invention, an eNB or an RN establishing an EPS bearer established for a UE is equivalently called as establishing a DRB for the UE. That is to say, when it is described that a first base station establishes one EPS bearer for a UE, it means that the first base station establishes one DRB for the UE.

In the above-mentioned two embodiments of the embodiments of the present invention, the UE may also have owned the first EPS bearer between the UE and the DeNB to which the UE belongs or owned the second EPS bearer between the UE and the RN to which the UE belongs, but the throughput of the data transmitted by the UE can not be satisfied merely through the first EPS bearer or the second EPS bearer. At this moment, the access network entity actively initiates a process of requesting to establish the EPS bearer or modify the EPS bearer, or the DeNB to which the UE belongs performs a process of actively establishing the EPS bearer. In the above-mentioned process of establishing the EPS bearer, if the UE does not have other new service demand except the current service, within a certain period of time, the data volume sum of the data transmitted by the established first EPS bearer and the data transmitted by the second EPS bearer is equal to the volume of data transmitted by the unmodified first EPS bearer or the volume of data transmitted by the unmodified second EPS bearer. If the network simultaneously establishes a new service for the UE in the above-mentioned process of establishing the EPS bearer, the data volume sum of the data transmitted by the established first EPS bearer and the data transmitted by the second EPS bearer is greater than the volume of data transmitted by the unmodified first EPS bearer or greater than the volume of data transmitted by the unmodified second EPS bearer.

FIG. 4 is a flow diagram of a method for establishing EPS bearers provided in an embodiment of the present invention. The method includes the steps as follows.

Step 401, a DeNB to which UE belongs establishes a first EPS bearer based on a first CC for the UE, wherein the first EPS bearer is an EPS bearer between the DeNB to which the UE belongs and the UE and has the number of one or more; and Step 402, the DeNB to which the UE belongs instructs an RN to which the UE belongs to establish a second EPS bearer based on a second CC for the UE, wherein the second EPS bearer is an EPS bearer between the RN to which the UE belongs and the UE and has the number of one or more.

In this way, the UE may transmit data with the DeNB to which the UE belongs through the established first EPS bearer and transmit data with the RN to which the UE belongs through the established second EPS bearer.

Figure 5:
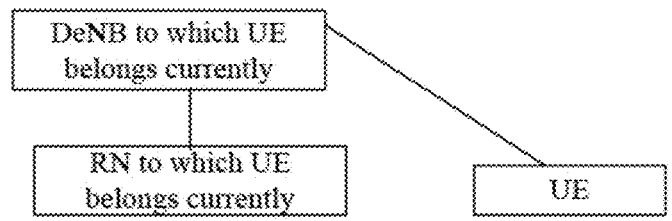
FIG. 5 is a structural schematic diagram of a system for establishing an EPS bearer provided in an embodiment of the present invention.

FIG. 5 is a structural schematic diagram of a system for establishing EPS bearers provided in an embodiment of the present invention. The system includes a UE, a DeNB to which the UE belongs and an RN to which the UE belongs.

The DeNB to which the UE belongs is configured to establish a first EPS bearer for the UE and instruct the RN to which the UE belongs to establish a second EPS bearer for the UE, wherein the first EPS bearer is an EPS bearer between the DeNB to which the UE belongs and the UE and has the number of one or more, and the second EPS bearer is an EPS bearer between the RN to which the UE belongs and the UE and has the number of one or more.

The RN to which the UE belongs is configured to establish the second EPS bearer for the UE under the instruction of the DeNB to which the UE belongs.

In the embodiment of the system, the system further includes an access network entity and a core network entity, wherein the access network entity is configured to send, to the core network entity, a request message for establishing an EPS bearer or a request message for modifying an EPS bearer for the UE.

The core network entity is configured to receive the request message for establishing the EPS bearer or the request message for modifying the EPS bearer sent by the access network entity and instruct the DeNB to which the UE belongs to establish the first EPS bearer and the second EPS bearer for the UE.

In the embodiment of the system, the DeNB to which the UE belongs is further configured to determine to establish the first EPS bearer and the second EPS bearer.

Figure 6:
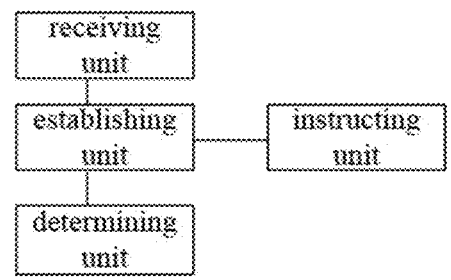
FIG. 6 is a structural schematic diagram of a first device for establishing an EPS bearer provided in an embodiment of the present invention.

FIG. 6 is a structural schematic diagram of a first device for establishing an EPS bearer provided in an embodiment of the present invention. The device may be a base station referred in the foregoing embodiments, and includes an establishing unit and an instructing unit.

The establishing unit is configured to establish a first EPS bearer based on a first CC for UE, wherein the first EPS bearer is an EPS bearer between a first base station to which the UE belongs and the UE.

The instructing unit is configured to instruct a second base station to which the UE belongs to establish a second EPS bearer based on a second CC, wherein the second EPS bearer is an EPS bearer between the second base station to which the UE belongs and the UE.

The base station may further include a receiving unit, which is configured to receive an instruction sent by a core network entity for establishing multiple EPS bearers based on multiple CCs for the UE, then trigger the establishing unit to establish the first EPS bearer for the UE and trigger the instructing unit to instruct the second base station to establish the second EPS bearer for the UE.

The base station may further include a determining unit, which is configured to independently determine to establish the first EPS bearer and the second EPS bearer for the UE, trigger the establishing unit to establish the first EPS bearer for the UE and trigger the instructing unit to instruct the second base station to establish the second EPS bearer for the UE.

Figure 7:
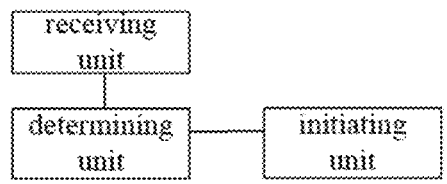
FIG. 7 is a structural schematic diagram of a second device for establishing an EPS bearer provided in an embodiment of the present invention.

FIG. 7 is a structural schematic diagram of a second device for establishing an EPS bearer provided in an embodiment of the present invention. The device may be a base station referred in the foregoing embodiments, and includes a determining unit and an initiating unit.

The determining unit is configured to determine to establish a second EPS bearer based on a second CC for UE owning a first EPS bearer based on a first CC and trigger the initiating unit.

The initiating unit is configured to initiate a process of establishing the second EPS bearer for the UE.

The base station may further include a receiving unit, which is configured to receive an instruction sent by a core network entity for establishing multiple EPS bearers based on multiple CCs for the UE and then send the instruction to the determining unit.

The determining unit is configured to receive the instruction for establishing the multiple EPS bearers based on the multiple CCs for the UE from the receiving unit and then determine to establish the second EPS bearer based on the second CC.

The respective units in the embodiments of the devices shown in FIG. 6 and FIG. 7 may specifically perform the flows described in the embodiments of the foregoing methods. These flows are not described redundantly herein, and reference may be made to the embodiments of the foregoing methods.

The embodiments of the present invention are illustrated by taking two specific embodiments below.

FIRST SPECIFIC EMBODIMENT

It is supposed that a UE has established a current first EPS bearer with a DeNB to which the UE belongs, and the UE adopts the active initiating solution to establish an EPS bearer. It is supposed that an access network entity therein is the UE and a core network entity is a PDN-GW.

Figure 8:
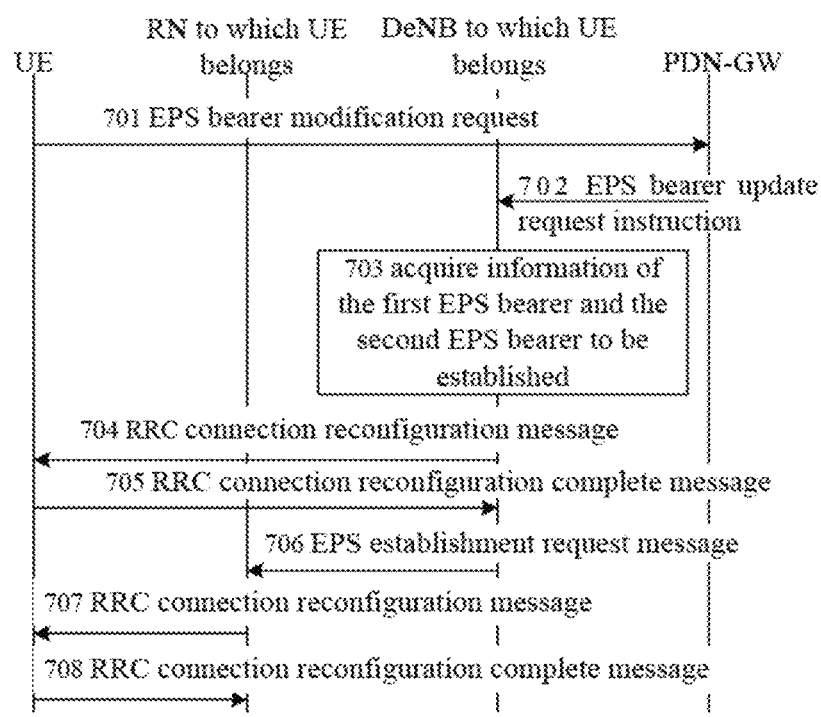
FIG. 8 is a flow diagram of a first specific embodiment of a method for establishing an EPS bearer provided in an embodiment of the present invention.

FIG. 8 is a flow diagram of a first specific embodiment of a method for establishing EPS bearers provided in an embodiment of the present invention. The method includes the steps as follows.

Step 701, the UE sends an EPS bearer modification request to the PDN-GW.

In this step, specifically, the UE or an RN or a DeNB initiates an E-RAB (E-UTRAN Radio Access Bearer) modification request message to request the PDN-GW or an S-GW or an MME for modifying the current single E-RAB of the UE into multiple EPS bearers to transmit data.

Step 702, after the PDN-GW receives the EPS bearer modification request, the PDN-GW determines that the current first EPS bearer is to be modified into a first EPS bearer and a second EPS bearer according to the state information value of the data transmitted by the UE such as a QoS demand, determines respective establishing nodes of the first EPS bearer and the second EPS bearer, namely determines that the first EPS bearer is established at the DeNB and the second EPS bearer is established at the RN, and sends an EPS bearer update request instruction carrying instruction modification information to the DeNB to which the UE belongs.

Step 703, the DeNB to which the UE belongs receives the EPS bearer update request instruction, and acquires information of the first EPS bearer and the second EPS bearer to be established.

In this step, the DeNB determines that the previous EPS bearer is to be modified into two new EPS bearers, one of which is to be established locally and the other one of which is to be established at the RN.

Step 704, the DeNB to which the UE belongs establishes the first EPS bearer for the UE, namely sends a radio resource control (RRC) connection reconfiguration message carrying information of the reconfigured first EPS bearer to the UE. The information of the first EPS bearer includes an identifier of the EPS bearer, an identifier of a correspondingly established DRB, a logical channel identifier, other access layer parameters and the like.

Step 705, after the UE receives the RRC connection reconfiguration message and then performs the establishment of the first EPS bearer with the DeNB to which the UE belongs according to the carried information of the reconfigured EPS bearer, the UE returns an RRC connection reconfiguration complete message to the DeNB to which the UE belongs.

Step 706, the DeNB to which the UE belongs sends, to the RN to which the UE belongs, an EPS establishment request message, such as an E-RAB establishment request message, carrying information of the second EPS bearer to be established.

Step 707, after the RN to which the UE belongs receives the EPS establishment request message, the RN sends an RRC connection reconfiguration message carrying information of the reconfigured second EPS bearer to the UE.

The information of the second EPS bearer includes an identifier of the EPS bearer, an identifier of a correspondingly established DRB, a logical channel identifier, other access layer parameters and the like.

Step 708, after the UE receives the RRC connection reconfiguration message and then performs the establishment of the second EPS bearer with the RN to which the UE belongs according to the carried information of the reconfigured second EPS bearer, the UE returns an RRC connection reconfiguration complete message to the RN to which the UE belongs.

Before this step, if the UE is not connected with the RN to which the UE belongs, a random access process is further needed.

In this specific embodiment, steps 704 to 705 and steps 706 to 708 may be simultaneously performed, or steps 706 to 708 are performed firstly and then steps 704 to 705 are performed, which is not limited herein.

In this specific embodiment, in step 702, the PDN-GW may also not determine the respective establishment nodes of the first EPS bearer and the second EPS bearer, but directly send the EPS bearer update request instruction to the DeNB, to instruct the DeNB to modify the EPS bearer into the first EPS bearer and the second EPS bearer; and in step 703, the DeNodB determines the respective establishment nodes of the first EPS bearer and the second EPS bearer according to the state information of the data transmitted by the UE, and the following steps are performed. Herein, the DeNB needs to feedback the respective establishment nodes of the first EPS bearer and the second EPS bearer determined by the DeNB back to the PDN-GW.

Alternatively, in this specific embodiment, in step 702, the PDN-GW may also not determine that the current first EPS bearer is to be modified into the first EPS bearer and the second EPS bearer, but directly send the EPS bearer update request instruction carrying the UE identifier to the DeNodB; and in step 703, the DeNodB determines that the current first EPS bearer is to be modified into the first EPS bearer and the second EPS bearer according to the state information value of the data transmitted by a UE with the UE identifier and determines the respective establishment nodes, namely determines that the first EPS bearer is established at the DeNB and the second EPS bearer is established at the RN, and the following steps are performed.

In this specific embodiment, it may also be supposed that a UE has established a current second EPS bearer with an RN to which the UE belongs, and the processes are similar which will not be described redundantly herein.

SECOND SPECIFIC EMBODIMENT

It is supposed that a UE has established a current second EPS bearer with an RN to which the UE belongs, and a DeNB to which the UE belongs adopts the active establishing solution to establish EPS bearer for the UE.

Figure 9:
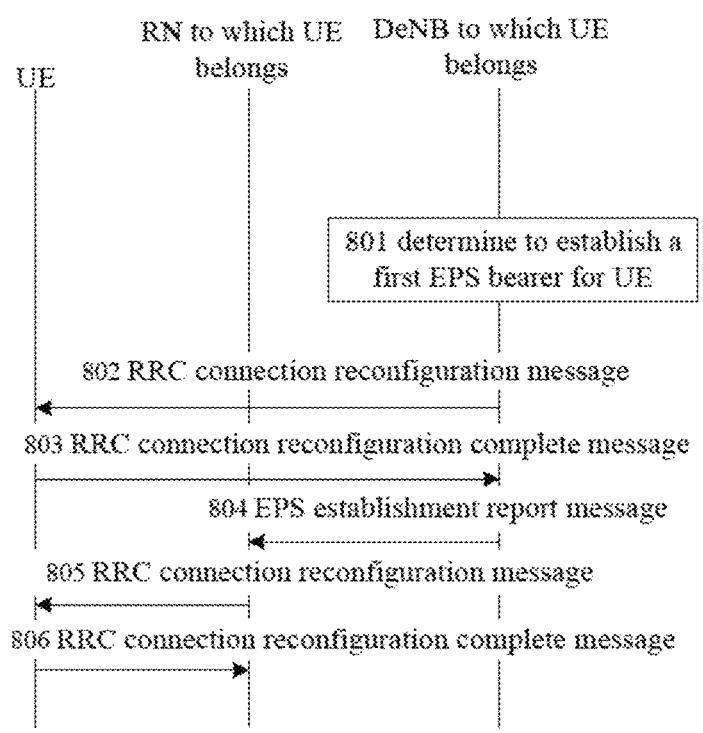
FIG. 9 is a flow diagram of a second specific embodiment of a method for establishing an EPS bearer provided in an embodiment of the present invention.

FIG. 9 is a flow diagram of a second specific embodiment of a method for establishing EPS bearer provided in an embodiment of the present invention. The method includes the steps as follows.

Step 801, the DeNB to which the UE belongs determines that the DeNB to which the UE belongs will share partial load of data transmitted by the UE for the RN to which the UE belongs, so a first EPS bearer needs to be established for the UE.

Before this step, the DeNB to which the UE belongs has independently determined that a current second EPS bearer has been established between the UE and the RN to which the UE belongs.

In this step, the established first EPS bearer is a virtual EPS bearer, that is to say, the first EPS bearer is invisible in core network.

Step 802, the DeNB to which the UE belongs sends an RRC connection reconfiguration message to the UE, carrying reconfigured EPS bearer information, namely information of the first EPS bearer to be established. The information of the first EPS bearer includes an identifier of an EPS bearer, an identifier of a correspondingly established DRB, a logical channel identifier, other access layer parameters and the like.

In this step, a QoS parameter adopted by the established first EPS bearer is the same as a QoS parameter adopted by the current second EPS bearer, and the identifier of the first EPS bearer may be the same as identifier of the current second EPS bearer herein.

Step 803, after the UE receives the RRC connection reconfiguration message and then performs establishment of the first EPS bearer with the DeNB to which the UE belongs according to the carried reconfigured EPS bearer information, the UE returns an RRC connection reconfiguration complete message to the DeNB to which the UE belongs.

In this step, if a synchronous connection has not been established previously between the UE and the DeNB to which the UE belongs, before step 803, the method further includes a random access process being performed between the UE and the DeNB to which the UE belongs, and a synchronous connection being established between the UE and the DeNB to which the UE belongs.

Step 804, the DeNB to which the UE belongs sends, to the RN to which the UE belongs, an EPS establishment report message carrying the identifier of the UE and the information of the established first EPS bearer.

Step 805, after the RN to which the UE belongs receives the EPS establishment report message, the RN sends an RRC connection reconfiguration message carrying information of a second EPS bearer to be established to the UE. The information of the second EPS bearer includes an identifier of an EPS bearer, an identifier of a correspondingly established DRB, a logical channel identifier, other access layer parameters and the like.

Step 806, after the UE receives the RRC connection reconfiguration message and then performs establishment of the second EPS bearer with the RN to which the UE belongs according to the carried information of the reconfigured second EPS bearer, the UE returns an RRC connection reconfiguration complete message to the RN.

In the embodiment of FIG. 8, if a current second EPS bearer has existed between the UE and the RN to which the UE belongs, the current second EPS bearer may be directly used as the second EPS bearer, namely the configuration parameter of the current second EPS bearer is not modified, and step 806 and step 807 are not performed, which is not described redundantly herein.

In this specific embodiment, it may also be supposed that a UE has established a current first EPS bearer with a DeNB to which the UE belongs, and the processes are similar which will not be described redundantly herein.

By adopting the method provided in the embodiments of the present invention, the throughput of the data transmitted by the UE at the cell margin governed by the cell to which the DeNB belongs may be improved, so that the throughput difference between the UE in the center of the cell and the UE at the margin of the cell is reduced, and the fairness of data transmission performance of the UE is improved.

Through the description of the above implementations, those skilled in the art may clearly realize that the present invention may be realized by means of software and necessary general hardware or through hardware, but the former is a better implementation under many conditions. Based on such an understanding, the technical solutions of the present invention substantially or the part of the present invention making contribution to the prior art may be embodied in the form of a software product, and the computer software product is stored in a readable storage medium, such as a soft disk, a hard disk, an optical disk or the like of a computer, which includes a plurality of instructions enabling computer equipment (which may be a personal computer, a server, network equipment or the like) to execute the method of each embodiment of the present invention.

The foregoing descriptions are merely preferred embodiments of the present invention, rather than limiting the present invention. Any modifications, equivalent substitutions, improvements and the like made within the spirit and principle of the present invention should be included in the protection scope of the present invention.

What is claimed is:
1. A method implemented by a user equipment (UE) owning a first data radio bearer (DRB) between a first base station and the UE, the method comprising:
   receiving a message for radio resource control (RRC) connection reconfiguration, wherein the message comprises information of a reconfigured first DRB and information of a second DRB, wherein the reconfigured first DRB is based on the first DRB, wherein the reconfigured first DRB is between the first base station and the UE, and wherein the second DRB is between a second base station and the UE;
   applying the information of the reconfigured first DRB;
   establishing the second DRB according to the information of the second DRB; and
   communicating data to the first base station and the second base station using the reconfigured first DRB and the second DRB, respectively.

2. The method of claim 1, wherein the reconfigured first DRB is modified based on the first DRB, and wherein the method further comprises establishing the reconfigured first DRB with the first base station.

3. The method of claim 1, wherein the information of the reconfigured first DRB includes a reconfigured first DRB identity, wherein the information of the second DRB includes a second DRB identity, and wherein the reconfigured first DRB identity is the same as the second DRB identity.

4. The method of claim 3, further comprising sending a second message indicating RRC connection reconfiguration complete to the first base station.

5. The method of claim 2, further comprising sending a second message indicating RRC connection reconfiguration complete to the first base station.

6. The method of claim 1, further comprising sending a second message indicating RRC connection reconfiguration complete to the first base station.

7. The method of claim 1, wherein the second DRB is based on the first DRB.

8. An apparatus comprising:
at least one processor; and
a memory coupled to the at least one processor and storing instructions that, when executed by the at least one processor, cause a user equipment (UE) owning a first data radio bearer (DRB) between a first base station and the UE to:
receive a message for radio resource control (RRC) connection reconfiguration, wherein the message comprises information of a reconfigured first DRB and information of a second DRB, wherein the reconfigured first DRB is based on the first DRB, wherein the reconfigured first DRB is between the first base station and the UE, and wherein the second DRB is between a second base station and the UE;
apply the information of the reconfigured first DRB;
establish the second DRB according to the information of the second DRB; and
communicate data to the first base station and the second base station
using the reconfigured first DRB and the second DRB, respectively.

9. The apparatus of claim 8, wherein the reconfigured first DRB is modified based on the first DRB, and wherein the instructions further cause the UE to establish the reconfigured first DRB with the first base station.

10. The apparatus of claim 8, wherein the information of the reconfigured first DRB includes a reconfigured first DRB identity, wherein the information of the second DRB includes a second DRB identity, and wherein the reconfigured first DRB identity is the same as the second DRB identity.

11. The apparatus of claim 10, wherein the instructions further cause the UE to send a second message indicating RRC connection reconfiguration complete to the first base station.

12. The apparatus of claim 9, wherein the instructions further cause the UE to send a second message indicating RRC connection reconfiguration complete to the first base station.

13. The apparatus of claim 8, wherein the instructions further cause the UE to send a second message indicating RRC connection reconfiguration complete to the first base station.

14. The apparatus of claim 8, wherein the second DRB is based on the first DRB.

15. A method for establishing a data radio bearer (DRB), the method comprising:
sending, by a first base station to which a user equipment (UE) owning a first DRB belongs, a message for radio resource control (RRC) connection reconfiguration,
wherein the message comprises information of a reconfigured first DRB,
wherein the reconfigured first DRB is modified based on the first DRB,
wherein the message comprises information of a second DRB, and
wherein the second DRB is between a second base station and the UE.

16. The method of claim 15, wherein the information of the reconfigured first DRB includes a reconfigured first DRB identity, wherein the information of the second DRB includes a second DRB identity, and wherein the reconfigured first DRB identity is the same as the the second DRB identity.

17. The method of claim 16, further comprising receiving, by the first based station, a second message indicating RRC connection reconfiguration complete.

18. The method of claim 16, wherein the second DRB is based on the first DRB.

19. The method of claim 15, further comprising receiving, by the first based station, a second message indicating RRC connection reconfiguration complete.

20. The method of claim 15, wherein the second DRB is based on the first DRB.

* * * * *